(12) United States Patent
Lim et al.

(10) Patent No.: US 8,572,273 B2
(45) Date of Patent: Oct. 29, 2013

(54) METHOD AND APPARATUS FOR REPRODUCING MULTIMEDIA DATA BY CONTROLLING REPRODUCING SPEED

(75) Inventors: Yong-hyun Lim, Seoul (KR);
Yong-gyoo Kim, Hanam-si (KR);
Gil-yoon Kim, Suwon-si (KR);
Tae-sung Park, Yongin-si (KR);
Su-hyung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 12/913,975

(22) Filed: Oct. 28, 2010

(65) Prior Publication Data

US 2011/0191491 A1 Aug. 4, 2011

(30) Foreign Application Priority Data

Feb. 4, 2010 (KR) ........................ 10-2010-0010474

(51) Int. Cl.
*G06F 15/16* (2006.01)
(52) U.S. Cl.
USPC ............. 709/231; 709/232; 709/233; 725/86; 725/93; 725/94; 725/95; 386/201; 386/203; 386/221; 386/222

(58) Field of Classification Search
USPC .......... 709/233; 725/86, 93, 94, 95; 386/201, 386/203, 221, 222
See application file for complete search history.

(56) References Cited

U.S. PATENT DOCUMENTS 7,707,614 B2 * 4/2010 Krikorian et al. ............... 725/94
2007/0237495 A1 * 10/2007 Terada et al. ................... 386/96

FOREIGN PATENT DOCUMENTS

KR 10-2005-0055075 A 6/2005

* cited by examiner

*Primary Examiner* — Alina N Boutah
*Assistant Examiner* — Adam Cooney
(74) *Attorney, Agent, or Firm* — Sughrue Mion, PLLC (57) ABSTRACT

Provided are a multimedia data reproducing method and an apparatus for controlling a multimedia data reproducing speed based on a multimedia data packet receiving speed. The method including controlling a reproducing speed of the multimedia data based on a first time difference between times at which a plurality of packets including the multimedia data are respectively received and a second time difference between times to respectively reproduce the multimedia data corresponding to the plurality of packets; and reproducing the multimedia data at the controlled reproducing speed.

17 Claims, 7 Drawing Sheets

METHOD AND APPARATUS FOR REPRODUCING MULTIMEDIA DATA BY CONTROLLING REPRODUCING SPEED

CROSS-REFERENCE TO RELATED PATENT APPLICATION

This application claims priority from Korean Patent Application No. 10-2010-0010474, filed on Feb. 4, 2010 in the Korean Intellectual Property Office, the disclosure of which is incorporated herein by reference in its entirety.

BACKGROUND

1. Field

The present general inventive concept relates to a method and an apparatus for reproducing multimedia data, and more particularly, to a method and an apparatus for reproducing multimedia data by controlling a reproducing speed.

2. Description of the Related Art

With the development of wired/wireless communication technology, multimedia data providing services have improved. Particularly, services that provide real-time multimedia streaming through wired/wireless networks have improved with increases in data transmission rates.

It is important for streaming services to provide multimedia data with highest quality of service (QoS) to users in spite of constantly changing network environment, and thus research and development of various technologies with respect to the streaming services are actively performed.

SUMMARY

The present general inventive concept provides a method and an apparatus for reproducing multimedia data by controlling a reproducing speed, and a computer readable recording medium storing a program for executing the method.

According to an aspect of the general inventive concept, there is provided a method of reproducing multimedia data, which includes controlling a reproducing speed of the multimedia data based on a first time difference between times at which a plurality of packets including the multimedia data are respectively received and a second time difference between times to respectively reproduce the multimedia data corresponding to the plurality of packets; and reproducing the multimedia data at the controlled reproducing speed.

The controlling of the reproducing speed of the multimedia data may include starting reproduction of the multimedia data, including setting a first time to start reproduction of the multimedia data at a speed lower than a normal reproducing speed, and setting a second time to start reproduction of the multimedia data at the normal reproducing speed, the second time occurring after the first time, and changing the second time based on the first time difference and the second time difference calculated during a period between the first time and the second time.

The first time may be before a time at which buffering for reproducing the multimedia data at the normal reproducing speed is completed.

The changing of the second time may include changing the second time to an earlier time when the first time difference is smaller than or equal to the second time difference, and not changing the second time when the first time difference is greater than the second time difference.

The changing of the second time may include changing the second time to an earlier time when the first time difference is smaller than or equal to the second time difference, and changing the second time to a later time when the first time difference is greater than the second time difference.

The reproducing of the multimedia data based on the controlled reproducing speed may include re-sampling and reproducing audio data corresponding to the multimedia data at a speed lower than the normal reproducing speed and reproducing video data corresponding to the multimedia data at a speed corresponding to the reproducing speed of the re-sampled audio data to reproduce the multimedia data at the speed lower than the normal reproducing speed during the period between the first time and the second time.

The controlling of the reproducing speed of the multimedia data may include setting the reproducing speed of the multimedia data to a normal reproducing speed when the first time difference is smaller than or equal to the second time difference, and setting the reproducing speed of the multimedia data to a speed lower than the normal reproducing speed when the first time difference is greater than the second time difference.

The second time difference may be calculated based on a difference between the time stamps of the plurality of packets.

The plurality of packets may include temporally continuous multimedia data.

According to another aspect of the general inventive concept, there is provided an apparatus for reproducing multimedia data, which includes a monitoring unit which calculates a first time difference between times at which a plurality of packets including the multimedia data are respectively received and a second time difference between times to respectively reproduce the multimedia data corresponding to the plurality of packets, a speed control unit which controls a reproducing speed of the multimedia data based on the first time difference and the second time difference, and a reproducing unit which reproduces the multimedia data at the controlled reproducing speed.

According to another aspect of the general inventive concept, there is provided a computer readable recording medium storing a program which causes a computer to execute the method of reproducing multimedia data.

According to the general inventive concept, reproduction of multimedia data can be started at a speed lower than a normal reproducing speed before buffering for reproducing the multimedia data at the normal reproducing speed is completed. Furthermore, the reproducing speed can be controlled based on a data receiving speed after reproduction of the multimedia data is started, and thus the multimedia data can be reproduced with high reproduction quality.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE EXEMPLARY EMBODIMENTS

The present general inventive concept will now be described more fully with reference to the accompanying drawings, in which exemplary embodiments of the present general inventive concept are shown.

Figure 1:
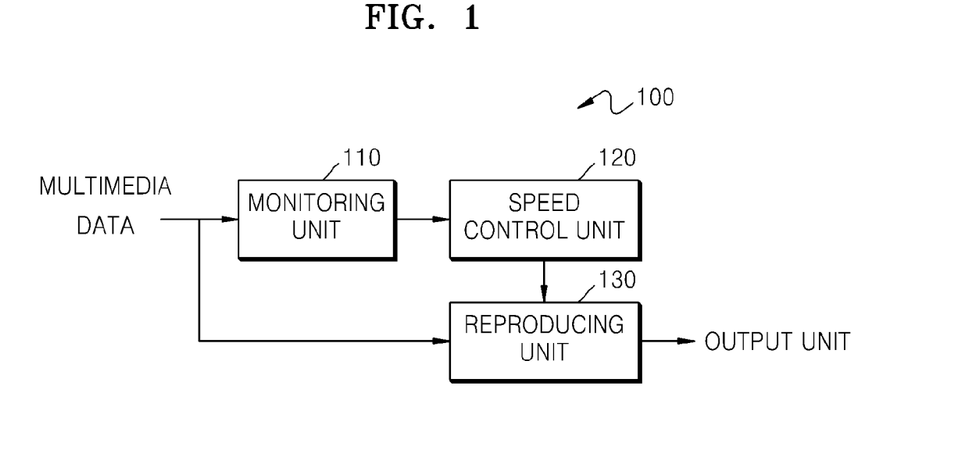
FIG. 1 is a block diagram of an apparatus for reproducing multimedia data, according to an exemplary embodiment of the general inventive concept.

FIG. 1 is a block diagram of a multimedia data reproducing apparatus 100, according to an exemplary embodiment of the general inventive concept.

Referring to FIG. 1, the multimedia data reproducing apparatus 100 includes a monitoring unit 110, a speed control unit 120 and a reproducing unit 130.

The monitoring unit 110 calculates a packet receiving speed used as a basis for reproducing speed control. Specifically, the monitoring unit 110 calculates a first time difference between times at which a plurality of packets including multimedia data are respectively received and a second time difference between times to respectively reproduce multimedia data corresponding to the plurality of packets. The plurality of packets may include temporally continuous multimedia data.

The monitoring unit 110 measures a time at which temporally continuous audio data or video data is received to calculate the first time difference and calculates the second time difference based on time stamps included in the plurality of packets.

For example, the monitoring unit 110 measures a time at which an audio data packet with respect to an (n−1)th symbol is received and a time at which an audio data packet with respect to an nth symbol is received to calculate the first time difference. In addition, the monitoring unit 110 calculates the second time difference with reference to the time stamp of the audio data packet with respect to the (n−1)th symbol and the time stamp of the audio data packet with respect to the nth symbol.

In a mathematical expression, the first time difference $DR(n)$ may be calculated according to $DR(n)=R(n)-R(n-1)$ and the second time difference $DT(n)$ may be calculated according to $DT(n)=T(n)-T(n-1)$. Here, $R(n)$ represents a time when an nth multimedia data packet is received by the multimedia data reproducing apparatus, $R(n-1)$ represents a time when an (n−1)th multimedia data packet is received by the multimedia data reproducing apparatus, $T(n)$ represents a time to reproduce the nth multimedia data packet, and $T(n-1)$ represents a time to reproduce the (n−1)th multimedia data packet.

The speed control unit 120 controls a multimedia data reproducing speed based on the first time difference and the second time difference calculated by the monitoring unit 110. The speed control unit 120 may control a time to start reproduction of multimedia data at a normal reproducing speed or control the reproducing speed. The operation of the speed control unit 120 will be explained in detail with reference to FIGS. 2A, 2B, 3A, 3B and 4.

Figure 2A:
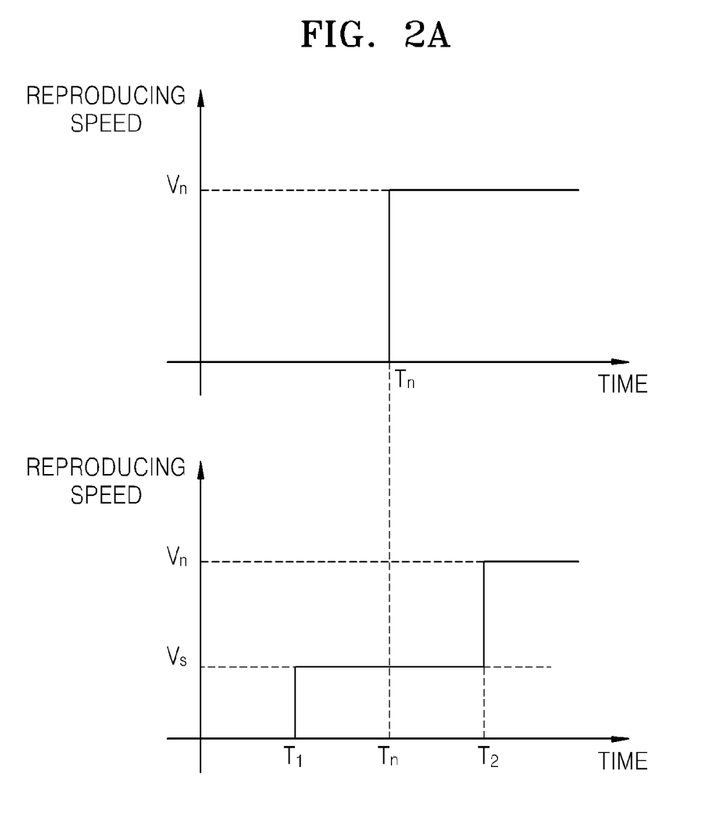
FIGS. 2A and 2B are graphs for explaining a method of starting reproduction of multimedia data at a speed lower than a normal reproducing speed, according to an exemplary embodiment of the general inventive concept.
Figure 2B:
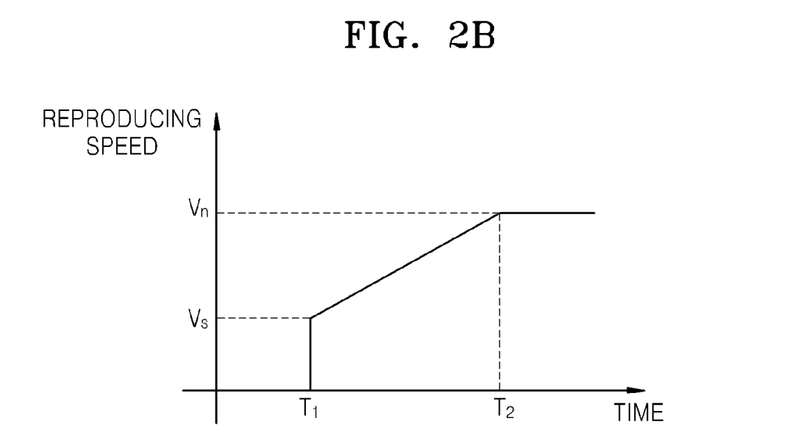

FIGS. 2A and 2B are graphs for explaining a method of starting reproduction of multimedia data at a speed lower than a normal reproducing speed, according to an exemplary embodiment of the general inventive concept.

Referring to FIG. 2A, the speed control unit 120 sets a time $T_1$ to start reproduction of the multimedia data at a speed lower than the normal reproducing speed and a time $T_2$ to start reproduction of the multimedia data at the normal reproducing speed in an initial stage of the reproduction of the multimedia data. The speed control unit 120 may control the reproducing unit 130 to reproduce the multimedia data by adjusting the reproducing speed based on the set times $T_1$ and $T_2$.

Times $T_1$ and $T_2$ may be fixed for all multimedia data to be reproduced or varied according to multimedia data characteristics. For example, if multimedia data has high audio quality and high video quality, a long time is required for buffering, and thus times $T_1$ and $T_2$ may be delayed as compared to multimedia data having low audio quality and low video quality.

As shown in the upper portion of FIG. 2A, a time Tn is required to receive and buffer the multimedia data to reproduce the multimedia data at the normal reproducing speed. In the current exemplary embodiment, however, reproduction of the multimedia data is started at time $T_1$ ahead of time Tn, as shown in the lower portion of FIG. 2A. Reproduction of the multimedia data is started at time $T_1$, which is prior to time Tn at which the multimedia data is reproduced at a normal reproducing speed Vn, at a speed Vs, which is lower than the normal reproducing speed Vn. The multimedia data is reproduced at Vs during a period from times $T_1$ to $T_2$ and then reproduced at the normal reproducing speed Vn from time $T_2$ at which buffering for reproducing the multimedia data at the normal reproducing speed is completed.

Referring to FIG. 2B, the multimedia data is not reproduced at a uniform reproducing speed (e.g., Vs) during the period from times $T_1$ to $T_2$, but instead may be reproduced at a reproducing speed which gradually increases from Vs to Vn.

Figure 3A:
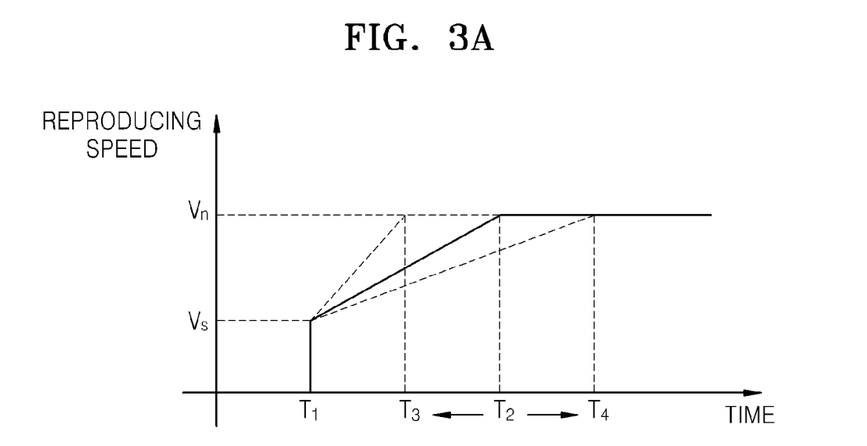
FIGS. 3A and 3B are graphs for explaining a method of controlling a time to start reproduction of multimedia data at the normal reproducing speed, according to an exemplary embodiment of the inventive concept.
Figure 3B:
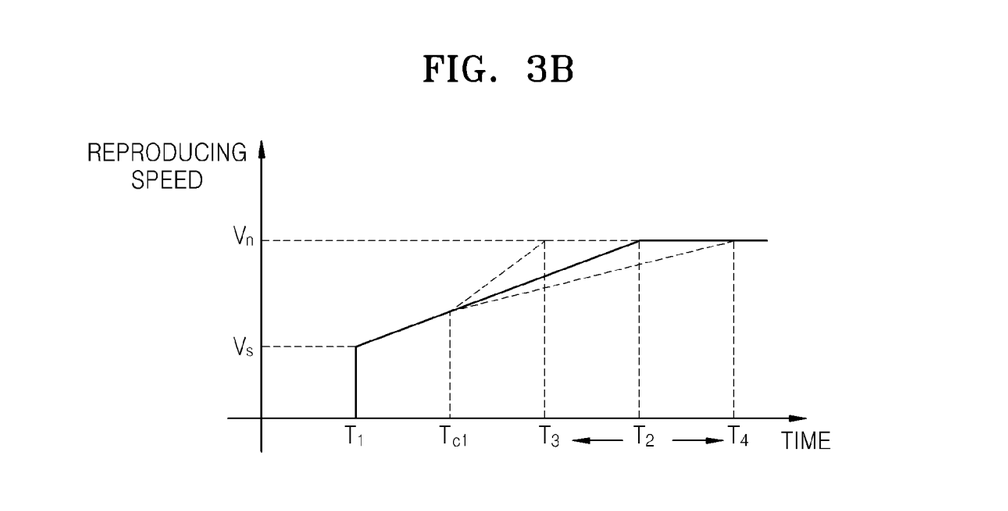

FIGS. 3A and 3B are graphs for explaining a method of controlling the time to start reproduction of the multimedia data at the normal reproducing speed, according to an exemplary embodiment. FIGS. 3A and 3B show a method of controlling the time to start reproduction of the multimedia data at the normal reproducing speed in the initial stage of reproduction of the multimedia data based on the first time difference and the second time difference calculated by the monitoring unit 110 shown in FIG. 1.

Referring to FIG. 3A, the speed control unit 120 may change time $T_2$ at which reproduction of the multimedia data is started at the normal reproducing speed to time $T_3$ or time $T_4$ to control the reproducing speed. The speed control unit 120 may change time $T_2$ to time $T_3$ or time $T_4$ based on the first time difference and the second time difference calculated by the monitoring unit 110 shown in FIG. 1. For example, if the first time difference is smaller than or equal to the second time difference, it is considered that a current multimedia data packet receiving speed is higher than or equal to a receiving speed required to reproduce the multimedia data at the normal reproducing speed, and thus the multimedia data can be reproduced without ceasing even when normal speed reproduction of the multimedia data is started at a time ahead of time $T_2$. The multimedia data can be received and buffered even when the multimedia data is reproduced at the normal reproducing speed since the multimedia data packet receiving speed is high, and thus time $T_2$ can be changed to an earlier time $T_3$.

On the other hand, if the first time difference is greater than the second time difference, it is considered that the multimedia data packet receiving speed is low, and thus time $T_2$ may not be changed. The reproducing speed may be gradually increased until time $T_2$, as shown in FIG. 2B, without changing time $T_2$. According to another exemplary embodiment, if the first time difference is greater than the second time difference, time $T_2$ may be delayed to a later time $T_4$, as shown in FIG. 3A. If the multimedia data packet receiving speed is low, buffering of the multimedia data for reproducing the multimedia data at the normal reproducing speed cannot be performed and a user has to experience repeated ceasing and buffering of the multimedia data during reproduction of the multimedia data. In this case, the multimedia data may be reproduced at a speed lower than the normal reproducing speed for a longer time to minimize the ceasing and buffering. To achieve this, the speed control unit 120 changes time $T_2$ to time $T_4$ behind time T2 such that the multimedia data is reproduced at a speed lower than the normal reproducing speed Vn for a period from time $T_1$ to time $T_4$.

Referring to FIG. 3B, the speed control unit 120 may calculate the first time difference and the second time difference during a period between time $T_1$ and time $T_2$ (i.e., a period during which the multimedia data is reproduced at a speed lower than the normal reproducing speed Vn) and change time $T_2$ to time $T_3$ or time $T_4$ based on the calculated first time difference and second time difference.

The reproducing speed may be increased for a period from time $T_1$ to time $T_{c1}$ to reach the normal reproducing speed at time $T_2$. Then, at time $T_{C1}$ it is determined whether time $T_2$ is changed to time $T_3$ or time $T_4$ based on the first time difference and the second time difference. Thereafter, time $T_2$ is changed to time $T_3$ or time $T_4$ according to the determination result determined at time $T_{c1}$. Subsequently, the reproducing speed is increased from time $T_{c1}$ to reach the normal reproducing speed at time $T_3$ or time $T_4$.

If it is determined that the first time different is smaller than the second time difference at time $T_{c1}$, it is considered that the multimedia data is received at a speed sufficient to reproduce the multimedia data at the normal reproducing speed, and thus time $T_2$ is changed to time $T_3$ to reproduce the multimedia data at a higher reproducing speed.

On the other hand, if it is determined that the first time different is greater than the second time difference at time $T_{c1}$, it is considered that the multimedia data is not received at a speed sufficient to reproduce the multimedia data at the normal reproducing speed, and thus time $T_2$ is changed to time $T_4$ to reproduce the multimedia data at a speed lower than the normal reproducing speed for a longer period. According to another exemplary embodiment, time $T_2$ may not be changed if the first time difference is greater than the second time difference.

FIG. 3B shows the example of determining whether time $T_2$ is changed based on the first time difference and the second time difference at time $T_{c1}$ between time $T_1$ and time $T_2$. Furthermore, it may be determined whether time $T_2$ is changed or not multiple times during the period between time $T_1$ and time $T_2$, or it may be determined whether time $T_2$ is changed or not whenever packets are received during the period between time $T_1$ and time $T_2$.

Figure 4:
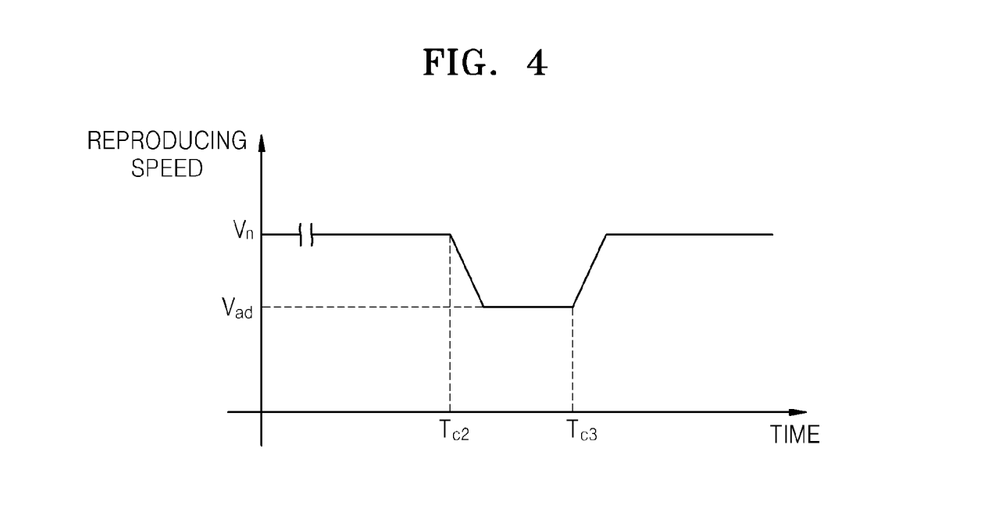
FIG. 4 is a graph for explaining a method of controlling a reproducing speed, according to an exemplary embodiment of the general inventive concept.

FIG. 4 is a graph for explaining a method of controlling a reproducing speed, according to an exemplary embodiment of the general inventive concept. FIG. 4 shows a method of controlling the reproducing speed of the multimedia data while the multimedia data is being reproduced.

Referring to FIG. 4, the speed control unit 120 shown in FIG. 1 may continuously control the multimedia data reproducing speed while the multimedia data is being reproduced. The monitoring unit 110 shown in FIG. 1 continuously calculates the first time difference and the second time difference between continuously received multimedia data packets even while the multimedia data is being reproduced.

The speed control unit 120 shown in FIG. 1 may control the multimedia data reproducing speed based on the first time difference and the second time difference continuously calculated by the monitoring unit 110 shown in FIG. 1 while the multimedia data is being reproduced.

As shown in FIG. 4, the speed control unit 120 may set the reproducing speed to speed $V_{ad}$, which is lower than the normal reproducing speed Vn, based on the first time difference and the second time difference calculated at time $T_{c2}$ by the monitoring unit 110 shown in FIG. 1 while the multimedia data is being reproduced at the normal reproducing speed Vn. If the first time difference is greater than the second time difference, it is considered that the multimedia data packet receiving speed is so low that the multimedia data cannot be reproduced properly at the normal reproducing speed. Accordingly, the reproducing speed is set to the lower speed $V_{ad}$.

At time $T_{c3}$ the speed control unit 120 shown in FIG. 1 makes another determination and controls the reproducing speed again based on the first time difference and the second time difference calculated by the monitoring unit 110 shown in FIG. 1 while the multimedia data is being reproduced at the reproducing speed $V_{ad}$. If the first time difference is smaller than or equal to the second time difference, it is considered that the multimedia data packet receiving speed is high enough that the multimedia data can be reproduced at the normal reproducing speed. Accordingly, the reproducing speed is set to the normal reproducing speed Vn.

Referring back to FIG. 1, the reproducing unit 130 reproduces the multimedia data at the reproducing speed controlled by the speed control unit 120. When the speed control unit 120 controls the reproducing speed based on the first time difference and the second time difference, the reproducing unit 130 reproduces buffered multimedia data at the controlled reproducing speed. The control of the reproducing speed has been described above with reference to FIGS. 2A, 2B, 3A, 3B and 4. The multimedia data may include audio data and video data. A method of reproducing audio data at a speed lower than the normal reproducing speed according to an exemplary embodiment of the general inventive concept will now be explained with reference to FIGS. 5 and 6.

Figure 5:
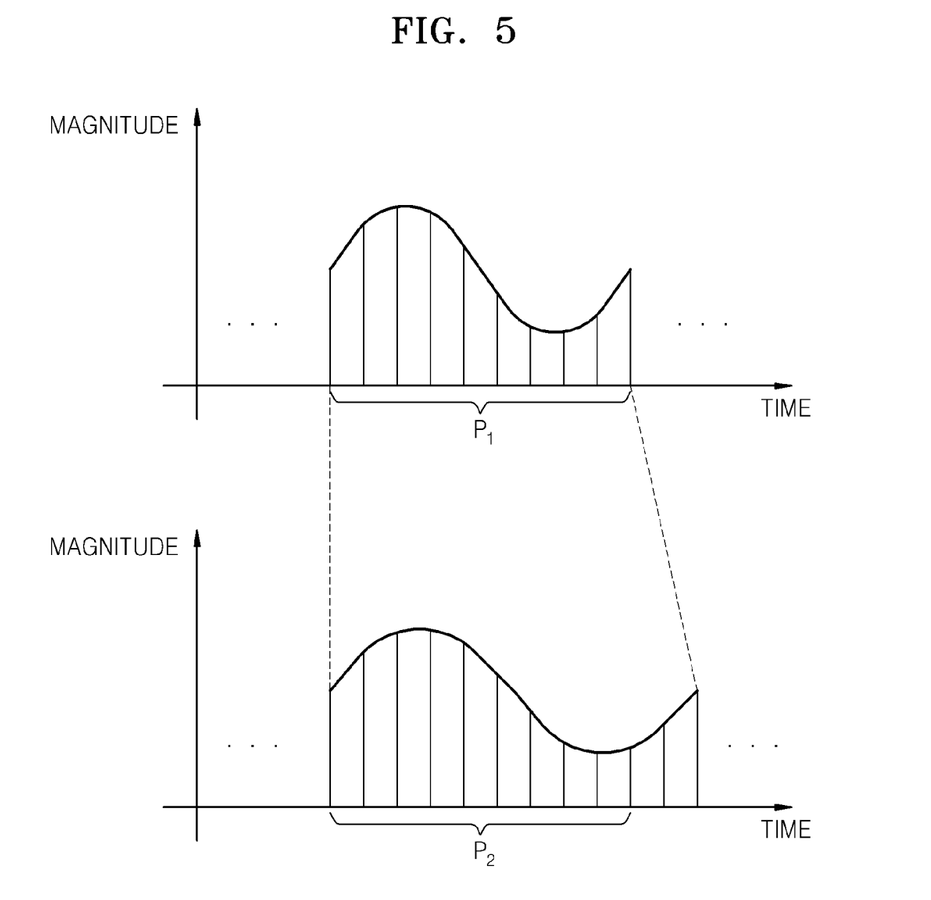
FIG. 5 is a graph for explaining a method of reproducing audio data, according to an exemplary embodiment of the general inventive concept.

FIG. 5 is a graph for explaining a method of reproducing the audio data, according to an exemplary embodiment of the general inventive concept.

The reproducing unit 130 shown in FIG. 1 is reproduces the multimedia data at a speed lower than the normal reproducing speed during the period from time $T_1$ to time $T_2$ shown in FIGS. 2A and 2B and reproduces the multimedia data at a speed lower than the normal reproducing speed during the period from time $T_1$ to time $T_3$ or time $T_4$ shown in FIGS. 3A and 3B. To achieve this, the reproducing unit 130 re-samples and reproduces the audio data.

Referring to FIG. 5, the reproducing unit 130 spreads out the audio data corresponding to a period $P_1$ to audio data corresponding to a period $P_2$ and slowly reproduces the spread out audio data. The reproducing unit 130 can slowly reproduce the audio data by spreading out the waveform of the audio data on the time base. However, if the number of symbols of the spread out audio data is equal to the number of symbols of the original audio data before being spread out, a time interval between neighboring symbols increases, and thus reproduction quality may be deteriorated. Accordingly, the audio data is re-sampled to increase the number of symbols of the audio data.

In the current exemplary embodiment of the general inventive concept, shown in FIG. 5, the audio data is re-sampled such that 10 symbols reproduced at the normal reproducing speed for $P_1$ is increased to 12 symbols reproduced for $P_2$. Accordingly, the time interval between neighboring symbols is maintained between the waveforms and the number of symbols is increased according to a rate of spreading out of the audio data on the time base. If the audio data is spread 1.2 times on the time base, 2 symbols are added to the 10 symbols, and thus 12 symbols are reproduced for $P_2$ as shown in FIG. 5.

Figure 6:
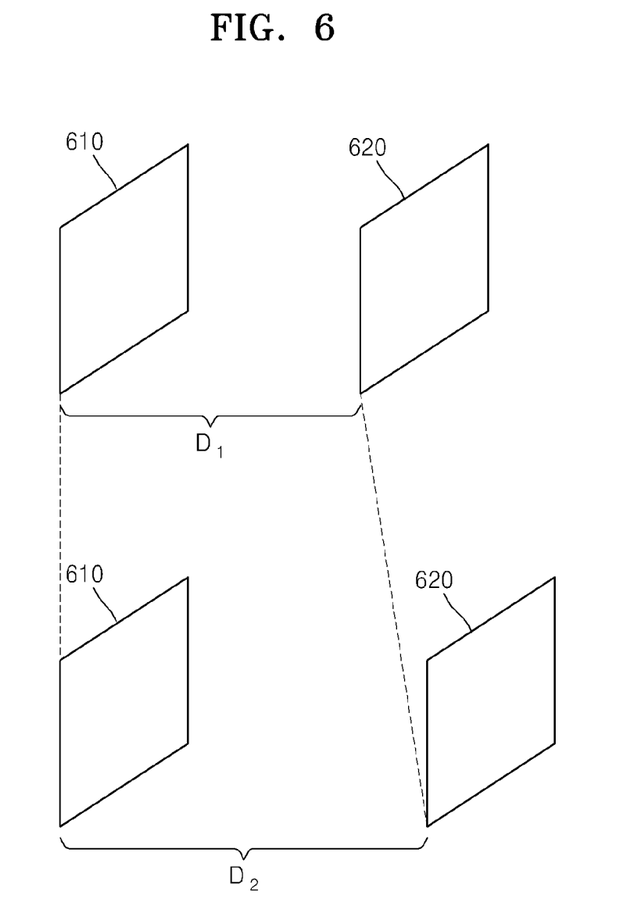
FIG. 6 is a diagram for explaining a method of reproducing video data, according to an exemplary embodiment of the general inventive concept.

FIG. 6 is a diagram for explaining a method of reproducing video data, according to an exemplary embodiment of the general inventive concept.

If the reproducing unit 130 shown in FIG. 1 reproduces the audio data at a speed lower than the normal reproducing speed, as shown in FIG. 5, the reproducing unit 130 reproduces the video data at a speed lower than the normal reproducing speed to synchronize the video data with the audio data. As shown in FIG. 6, the reproducing unit 130 can reproduce the video data at a lower speed by increasing a time interval between neighboring frames. A time interval between an (n−1)th frame 610 and an nth frame 620 is increased from $D_1$ to $D_2$ to synchronize the video data with the audio data. Time stamps of the (n−1)th and nth frames 610 and 620 are changed according to the re-sampled audio data reproducing speed to increase $D_1$ to $D_2$.

If the audio data is reproduced at a speed lower than the normal reproducing speed in the exemplary embodiment shown in FIG. 5, the audio data includes two more symbols, and thus $P_2$ corresponds to a 1.2 multiple of $P_1$. Accordingly, the time interval between the continuous frames 610 and 620 shown in FIG. 6 is increased 1.2 times, and thus $D_2$ may be a 1.2 multiple of $D_1$.

Figure 7:
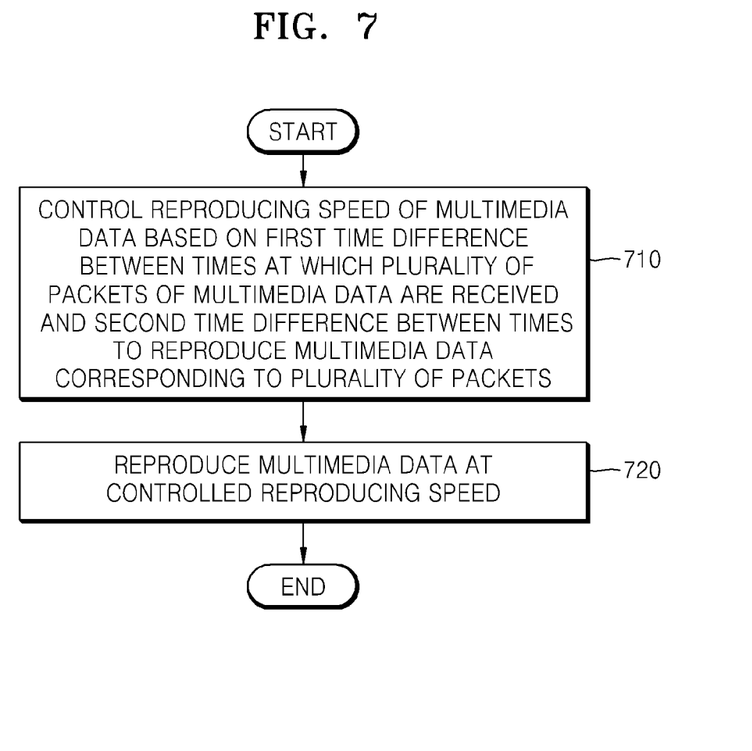
FIG. 7 is a flowchart showing a method of reproducing multimedia data, according to an exemplary embodiment of the general inventive concept.

FIG. 7 is a flowchart showing a method of reproducing multimedia data, according to the exemplary embodiment of the general inventive concept.

Referring to FIG. 7, the multimedia data reproducing apparatus 100, shown in FIG. 1, controls the multimedia data reproducing speed based on the first time difference between times at which a plurality of packets of the multimedia data are respectively received and the second time difference between times to respectively reproduce multimedia data signals corresponding to the plurality of packets, in operation 710. The plurality of packets may include temporally continuous multimedia data. The plurality of packets may include data with respect to temporally continuous audio symbols or data with respect to temporally continuous video frames.

If the first time difference is smaller than the second time difference, it is considered that the multimedia data is received at a speed that allows the multimedia data to be reproduced at a normal reproducing speed. If the first time difference is greater than the second time difference, it is considered that the multimedia data is received at a speed that does not allow the multimedia data to be reproduced at the normal reproducing speed.

Accordingly, in the initial stage of reproduction of the multimedia data, time $T_2$ at which reproduction of the multimedia data is started at the normal reproducing speed can be changed based on the first time difference and the second time difference, as shown in FIGS. 3A and 3B. Furthermore, the reproducing speed can be set to the normal reproducing speed Vn or the reproducing speed $V_{ad}$ lower than the normal reproducing speed Vn based on the first time difference and the second time difference while the multimedia data is being reproduced.

In operation 720, the multimedia data reproducing apparatus 100, shown in FIG. 1, reproduces the multimedia data at the reproducing speed controlled in operation 710. The multimedia data reproducing apparatus 100 may re-sample and reproduce audio data of the multimedia data during a period in which the multimedia data is reproduced at a speed lower than the normal reproducing speed, as shown in FIG. 5, and reproduce video data of the multimedia data at a speed corresponding to the reproducing speed of the re-sampled audio data, as shown in FIG. 6. Accordingly, the multimedia data reproducing apparatus 100 can reproduce the audio data and the video data in synchronization with each other by changing the time stamps of frames of the video data based on the reproducing speed of the re-sampled audio data.

Figure 8:
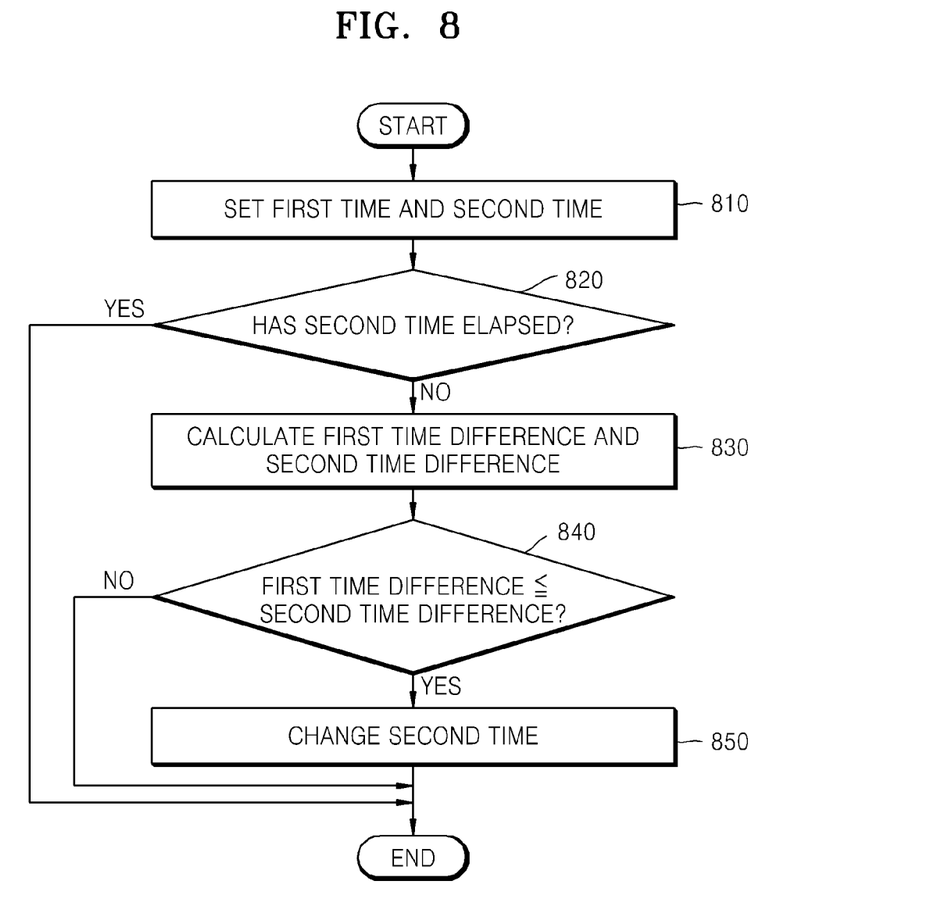
FIG. 8 is a flowchart showing a method of controlling a multimedia data, reproducing speed according to an exemplary embodiment of the general inventive concept.

FIG. 8 is a flowchart showing a method of controlling the multimedia data reproducing speed, according to an embodiment of the inventive concept. FIG. 8 illustrates operation 710 shown in FIG. 7 in more detail.

Referring to FIG. 8, the multimedia data reproducing apparatus 100, shown in FIG. 1, sets a first time to start reproduction of the multimedia data at a speed lower than the normal reproducing speed and sets a second time to start reproduction of the multimedia data at the normal reproducing speed in the initial stage of reproducing of the multimedia data in operation 810. The first time and the second time respectively correspond to time $T_1$ and time $T_2$ shown in FIGS. 2A, 2B, 3A and 3B.

The multimedia data reproducing apparatus 100 determines whether the second time has elapsed in operation 820. FIG. 8 shows a method of controlling the reproducing speed in the initial stage of reproduction of the multimedia data. Accordingly, there is no need to control the reproducing speed according to the method shown in FIG. 8 if the second time has elapsed, and therefore the multimedia data is reproduced at the normal reproducing speed.

When the multimedia data reproducing apparatus 100 determines that the second time has not elapsed in operation 820, the multimedia data reproducing apparatus 100 calculates the first time difference between times at which continuous packets from a plurality of packets of the multimedia data are respectively received and the second time difference between times to respectively reproduce the continuous packets, in operation 830. The method of calculating the first time difference and the second time difference has been described with respect to the monitoring unit 110 in reference to FIG. 1.

The multimedia data reproducing apparatus 100 determines whether the first time difference is less than or equal to the second time difference calculated in operation 830 in operation 840. If the first time difference is smaller than or equal to the second time difference, it is considered that the multimedia data is received at a speed that allows the multimedia data to be reproduced at the normal reproducing speed, and thus the second time is changed through operation 850. The second time to start reproduction of the multimedia data at the normal reproducing speed is set to time $T_3$ ahead of time $T_2$. Since the multimedia data can be buffered and reproduced at the normal reproducing speed even when the reproduction of the multimedia data is started fast, the second time is set to time $T_3$ prior to time $T_2$.

If the first time difference is greater than the second time difference in operation 840, the multimedia data cannot be reproduced at the normal reproducing speed because the multimedia data receiving speed is low. Accordingly, the second time is not changed. According to another exemplary embodiment of, if the first time difference is greater than the second time difference in operation 840, time $T_2$ may be delayed to a later time $T_4$, as described above with reference to FIGS. 3A and 3B.

Furthermore, operations 820, 830, 840 and 850 for controlling the reproducing speed may be performed multiple times during a period between the first time and the second time, or may be carried out whenever multimedia data packets are received, as described with reference to FIG. 3B.

While the general inventive concept has been particularly shown and described with reference to exemplary embodiments thereof, it will be understood that various changes in form and details may be made therein without departing from the spirit and scope of the following claims. The general inventive concept can be embodied as computer readable codes on a computer readable recording medium.

For example, the multimedia data reproducing apparatus according to an exemplary embodiment of the general inventive concept may include buses coupled to the respective units shown in FIG. 1 and at least one processor coupled to the buses. The respective units shown in FIG. 1 may include at least one processor configured to the functions of one or more of the exemplary embodiments. Furthermore, the multimedia data reproducing apparatus according to an exemplary embodiment of the general inventive concept may include a memory connected to the buses to store commands and received messages or generated messages and coupled to at least one processor for executing the commands.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and other non-transitory computer readable storage media.

What is claimed is:

1. A method of reproducing multimedia data, the method comprising:
   controlling a reproducing speed of the multimedia data based on a first time difference between times at which a plurality of packets including the multimedia data are respectively received and a second time difference between times to respectively reproduce the multimedia data corresponding to the plurality of packets; and
   reproducing the multimedia data at the controlled reproducing speed,
   wherein the controlling of the reproducing speed of the multimedia data comprises:
      starting reproduction of the multimedia data, comprising setting a first time to start reproduction of the multimedia data at a speed lower than a normal reproducing speed, and setting a second time to start reproduction of the multimedia data at the normal reproducing speed, the second time occurring after the first time; and
      changing the second time based on the first time difference and the second time difference calculated during a period between the first time and the second time.

2. The method of claim 1, wherein the first time is before a time at which buffering for reproducing the multimedia data at the normal reproducing speed is completed.

3. The method of claim 1, wherein the changing of the second time comprises:
   changing the second time to an earlier time when the first time difference is smaller than or equal to the second time difference; and
   not changing the second time when the first time difference is greater than the second time difference.

4. The method of claim 1, wherein the changing of the second time comprises:
   changing the second time to an earlier time when the first time difference is smaller than or equal to the second time difference; and
   changing the second time to a later time when the first time difference is greater than the second time difference.

5. The method of claim 1, wherein the reproducing of the multimedia data at the controlled reproducing speed comprises:
   re-sampling and reproducing audio data corresponding to the multimedia data at the speed lower than the normal reproducing speed; and
   reproducing video data corresponding to the multimedia data at a speed corresponding to the reproducing speed of the re-sampled audio data to reproduce the multimedia data at the speed lower than the normal reproducing speed during the period between the first time and the second time.

6. The method of claim 1, wherein the controlling of the reproducing speed of the multimedia data comprises:
   setting the reproducing speed of the multimedia data to the normal reproducing speed when the first time difference is smaller than or equal to the second time difference; and
   setting the reproducing speed of the multimedia data to the speed lower than the normal reproducing speed when the first time difference is greater than the second time difference.

7. The method of claim 1, wherein the second time difference is calculated based on a difference between time stamps of the plurality of packets.

8. The method of claim 1, wherein the plurality of packets include temporally continuous multimedia data.

9. An apparatus for reproducing multimedia data, the apparatus comprising:
   a monitoring unit comprising a processor which calculates a first time difference between times at which a plurality of packets including the multimedia data are respectively received and a second time difference between times to respectively reproduce the multimedia data corresponding to the plurality of packets;
   a speed control unit which controls a reproducing speed of the multimedia data based on the first time difference and the second time difference; and
   a reproducing unit which reproduces the multimedia data at the controlled reproducing speed, wherein
      when starting reproduction of the multimedia data, the speed control unit sets a first time to start reproduction of the multimedia data at a speed lower than a normal reproducing speed, and sets a second time to start reproduction of the multimedia data at the normal reproducing speed, the second time occurring after the first time, and
      the speed control unit changes the second time based on the first time difference and the second time difference calculated during a period between the first time and the second time.

10. The apparatus of claim 9, wherein the first time is before a time at which buffering for reproducing the multimedia data at the normal reproducing speed is completed.

11. The apparatus of claim 9, wherein the speed control unit changes the second time to an earlier time when the first time difference is smaller than or equal to the second time difference, and does not change the second time when the first time difference is greater than the second time difference.

12. The apparatus of claim 9, wherein the speed control unit changes the second time to an earlier time when the first time difference is smaller than or equal to the second time difference, and changes the second time to a later time when the first time difference is greater than the second time difference.

13. The apparatus of claim 9, wherein the reproducing unit re-samples and reproduces audio data corresponding to the multimedia data at the speed lower than the normal reproducing speed, and reproduces video data corresponding to the multimedia data at a speed corresponding to the reproducing speed of the re-sampled audio data to reproduce the multimedia data at the speed lower than the normal reproducing speed during the period between the first time and the second time.

14. The apparatus of claim 9, wherein the speed control unit sets the reproducing speed of the multimedia data to the normal reproducing speed when the first time difference is smaller than or equal to the second time difference, and sets the reproducing speed of the multimedia data to the speed lower than the normal reproducing speed when the first time difference is greater than the second time difference.

15. The apparatus of claim 9, wherein the second time difference is calculated based on a difference between time stamps of continuous packets from the plurality of packets.

16. The apparatus of claim 9, wherein the plurality of packets include temporally continuous multimedia data.

17. A non-transitory computer readable recording medium storing a program for causing a computer to execute the method of claim 1.

* * * * *